July 28, 1925.　　　　　　　　　　　　　　　　　　　　　1,547,399
M. M. KAUFMANN ET AL
METHOD OF MAKING PENCIL BODIES
Filed Jan. 15, 1923　　　4 Sheets-Sheet 1
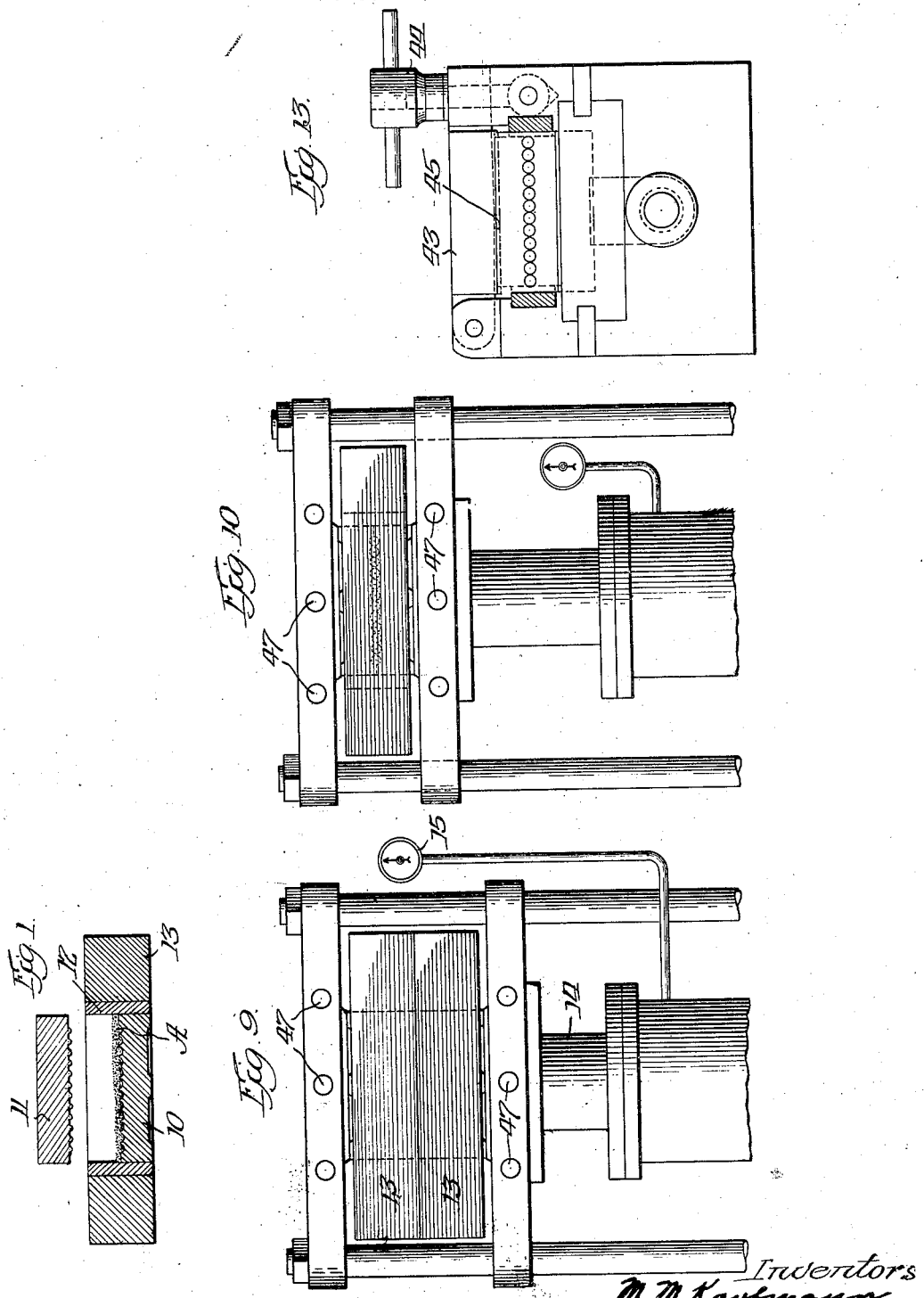

July 28, 1925.
M. M. KAUFMANN ET AL
METHOD OF MAKING PENCIL BODIES
Filed Jan. 15, 1923
1,547,399
4 Sheets-Sheet 2
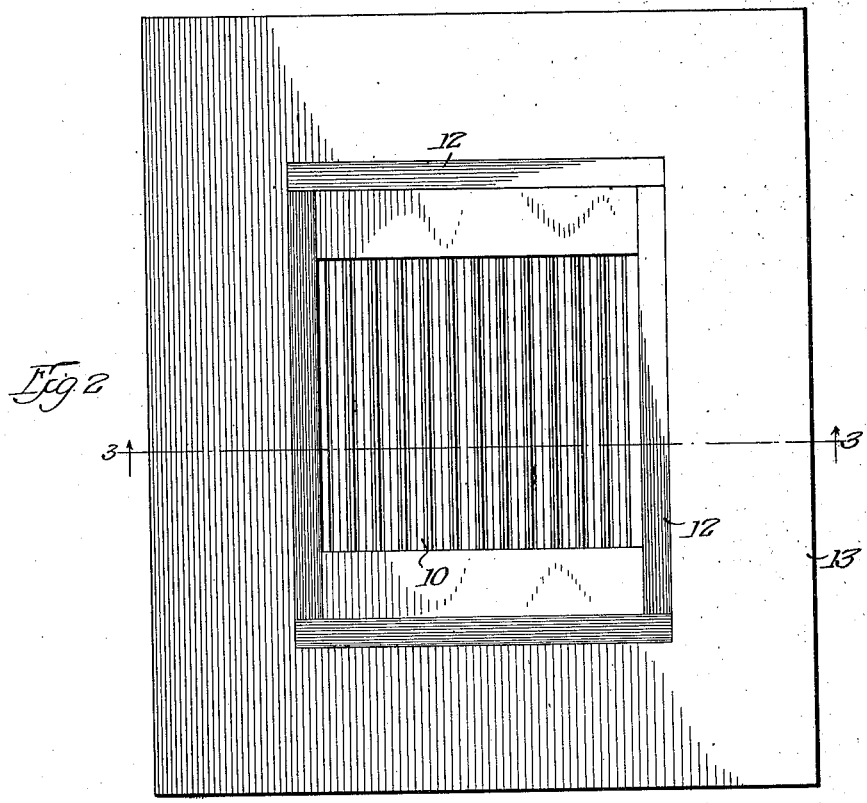
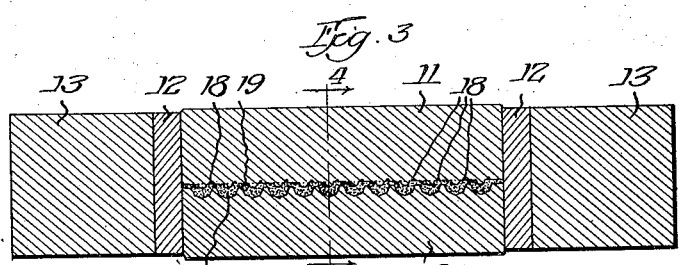
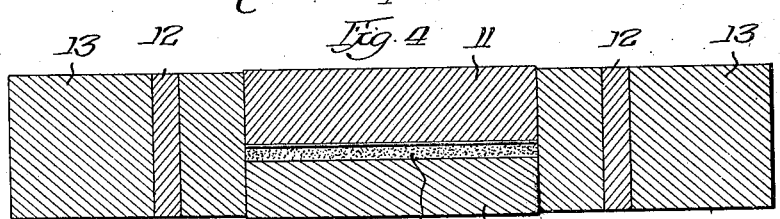
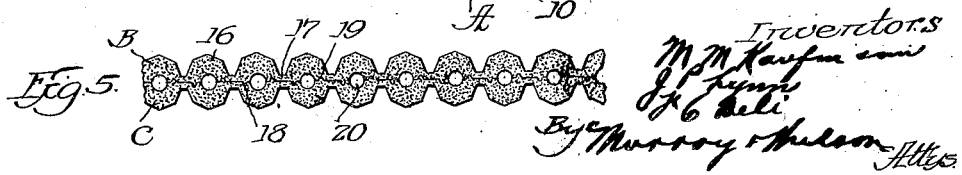

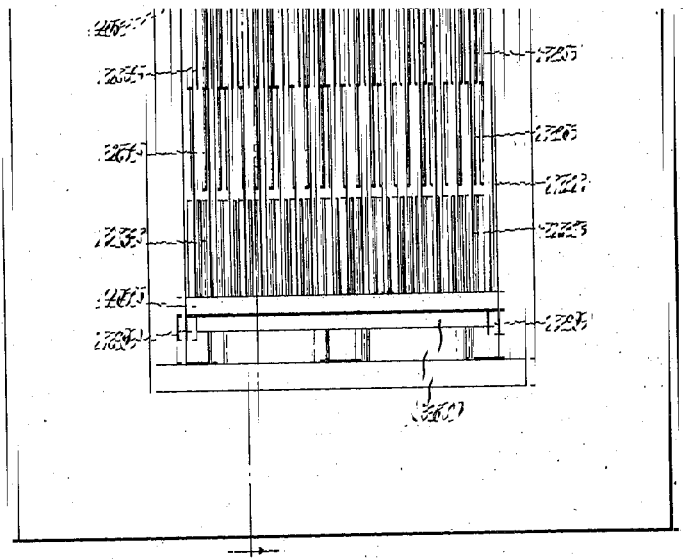
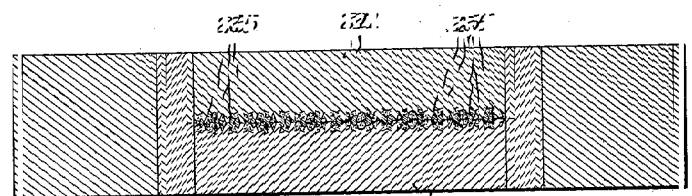
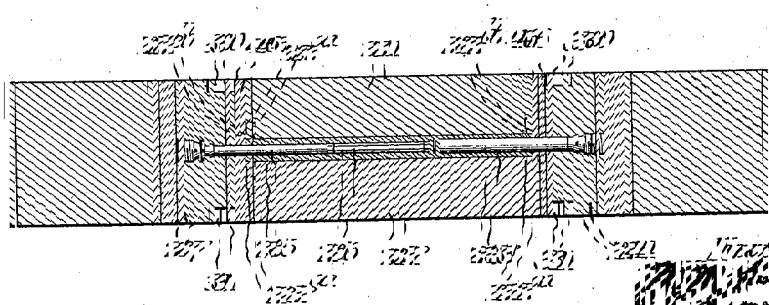

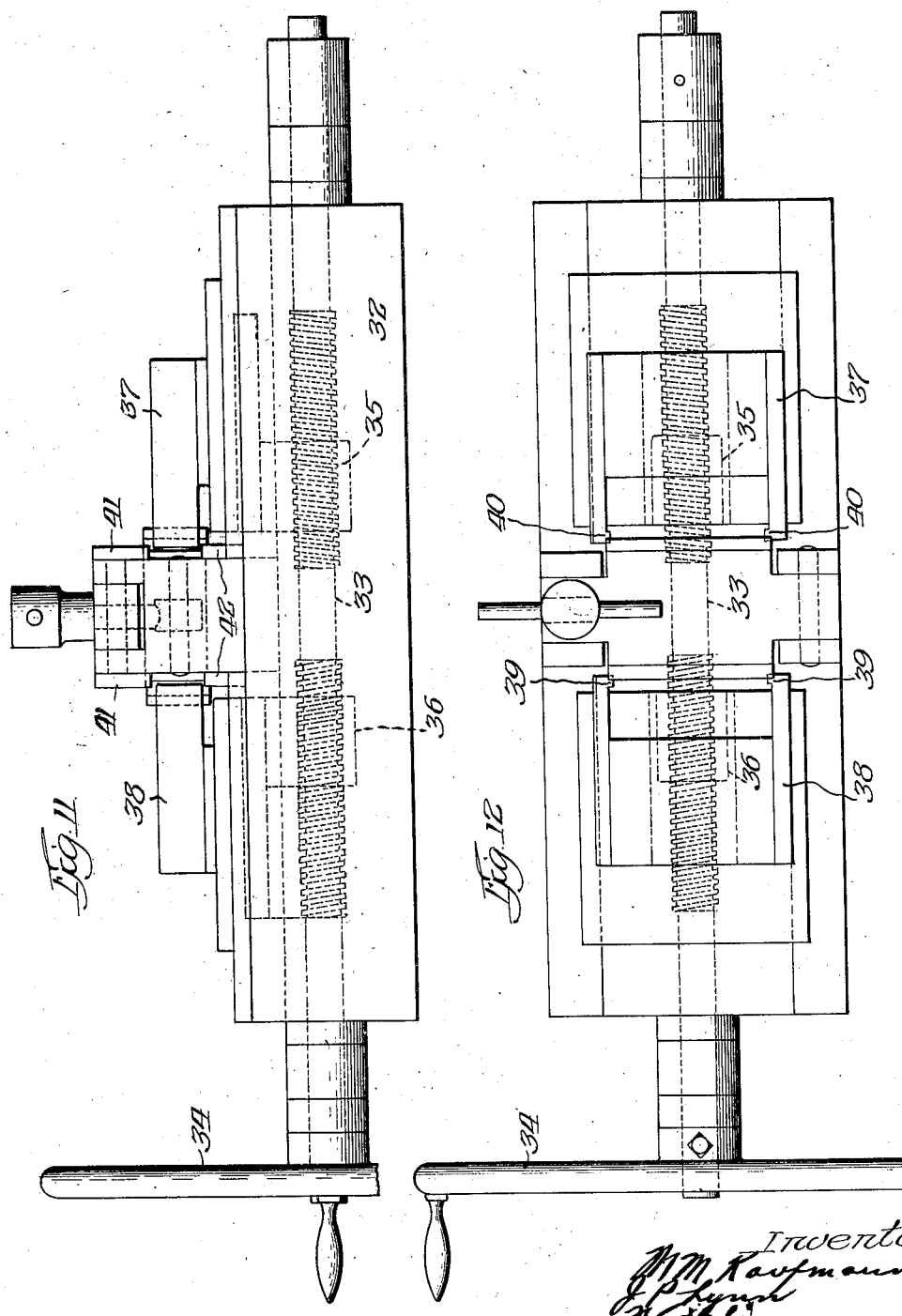

Patented July 28, 1925.

1,547,399

UNITED STATES PATENT OFFICE.

MICHAEL M. KAUFMANN, JOHN P. LYNN, AND FRANK C. DELI, OF CHICAGO, ILLINOIS, ASSIGNORS TO REALITE PENCIL MANUFACTURING COMPANY, OF CHICAGO, ILLINOIS, A CORPORATION OF ILLINOIS.

METHOD OF MAKING PENCIL BODIES.

Application filed January 15, 1923. Serial No. 612,617.

*To all whom it may concern:*

Be it known that we, MICHAEL M. KAUFMANN, JOHN P. LYNN, and FRANK C. DELI, citizens of the United States, and residents of Chicago, in the county of Cook and State of Illinois, have invented certain new and useful Improvements in a Method of Making Pencil Bodies, of which the following is a specification.

Our invention relates to a process of forming pencil bodies of a phenolic condensation product or similar fusible powdered or granular material. The invention was first disclosed in the copending application of Frank C. Deli, Serial No. 504,839, filed October 3, 1921.

In the application heretofore identified there is disclosed a process of forming pencil bodies which consists in separately completing halves of pencil bodies, then joining the same by the fusion of a quantity of the same material between the separate halves. This process presents some difficulties which are overcome in that which is here described.

It will be understood that the material employed is capable of being fused, under heat and pressure, the resulting product being extremely hard and tough and by molding it under high pressure it has a natural polish. A peculiarity is, however, that the material can, so far as practical operations are concerned, be fused but once and therefore the completed product must be turned out in a final fusing operation. Furthermore, in the production of pencil bodies it is necessary, at least in the present instance, to mold the material so as to provide axial openings at either end of the body or barrel. Inasmuch as it has been found in practice that the bodies cannot be molded in one operation, we have conceived and put in practice a method by which a sufficient quantity of the powdered material to form a specified plurality of halves of pencil bodies is placed between suitably shaped dies or molds and pressure applied thereto together with sufficient heat to partially fuse the material. This fusion and pressure should be only that sufficient to retain the material in self-sustaining form. Even though the product resulting from this step is fragile and easily broken, it is sufficiently rigid to enable the incomplete product to be handled and positioned for the next operation.

It will be understood that the series of halves are joined by a fin of material. The succeeding step consists in assembling two of said series of halves between suitably shaped dies, applying a high degree of pressure together with sufficient heat to complete the fusing operation and to substantially entirely displace the material of the fins between the adjacent sections. This results in fusing together the two halves in such manner that no division line is visible and if the quantity of material is exactly proportioned, there remains no fin or excess of material at the division point between the dies.

The axial openings in the body are provided by locating pins of proper shape between the halves when they are placed between the final die, the ends of the pins projecting from the finished product. Thereafter the pins are stripped by longitudinal movement. By this process the pencil bodies are entirely completed in the two major operations and no hand or machine work is necessary.

The method will be more readily understood by reference to the accompanying drawings, wherein:

Figure 1 is a view showing the first step in the process, the powdered material being shown in the mold before formation;

Figure 2 is a plan view of the bottom mold or die such as used in the first operation;

Figure 3 is a sectional view on the line 3—3 of Figure 2 showing the conformation of the product after the application of heat and pressure thereto by the dies;

Figure 4 is a view taken on the line 4—4 of Figure 3;

Figure 5 is a sectional view somewhat enlarged showing two assembled halves of pencil bodies composed of the solidified material;

Figure 6 is a plan view of one of the dies employed in the final operation, showing in addition, the pins or mandrils employed for forming the axial openings in the body;

Figure 7 is a sectional view taken on the line 7—7 of Figure 6, the view being taken with the upper and lower dies in position;

Figure 8 is a view taken at right angles to that of Figure 7;

Figure 9 is a view of the press employed in the first step of the operation;

Figure 10 is a view of the press employed in the second step;

Figure 11 is a side elevation of the stripping machine for removing the mandrils or cores from the molded product;

Figure 12 is a plan view thereof; and

Figure 13 is a transverse sectional view through the stripping machine.

In the first step of the operation the powdered material, indicated at A in Figure 1, is placed on the bottom die 10 and evenly distributed, the quantity thereof being accurately determined by weight or measure in order to provide exactly the required amount to complete the blank or "biscuit." The upper die 11 is then placed in position and the assembly, which includes the dies, the end plates 12, and the mold frame 13, are placed in the press indicated in Figure 9. In that view two molds 13 are being acted upon. Heat is applied to the mold in any suitable manner, preferably by electricity, and the plunger 14 is elevated, the operator observing, by means of the gauge 15, the pressure applied. After applying a pressure of ten to fifteen tons and just at the point where fusion of the material begins, as indicated by a drop in pressure, the force is relieved, the die blocks separated and the biscuits removed. There will have been formed in each of the molds a series of halves of pencil bodies which when assembled appear as in Figure 5. These blanks which are lettered B, C, each consist of a plurality of semi-octagonal portions 16, each said portion being joined to an adjacent portion by a fin 17. On the face of each portion, at one side, is a longitudinal rib 18 and at the other side a corresponding groove 19. At the axis of the combined halves is an opening 20. In the next step of the operation the biscuits, after being assembled as shown in Figure 5 with a rib 18 occupying a groove 19, are placed between the dies 21, 22, shown in Figures 7 and 8, the faces of which are counterparts. In practice one-half is placed in the lower die and then the mandrils or pins are positioned. In molding the pencil body here described, we provide an opening of varying diameter, the larger opening being formed by means of pins 23 rigidly secured to the head block 24. The smaller opening is formed by a pin having a round portion 25 and a flattened terminal portion 26, these pins being securely held at the head block 27. The pins and blocks are clearly shown in Figure 6. The head blocks are provided with vertical grooves 28, 29, at the sides thereof and horizontal grooves 30, 31, on the top and bottom thereof for a purpose hereafter described.

After the biscuits have been positioned, as shown in Figures 7 and 8, the mold is placed in the press shown in Figure 10 and pressure applied to a degree somewhat greater than in the first operation. A force of forty to fifty tons together with suitable heat, sufficient to complete the fusing operation and to shape the pencil bodies as indicated in Figure 8, is applied. At the proper point the pressure is relieved, the mold removed and the dies separated whereupon the head blocks and pins together with the molded pencil bodies are placed in the stripper shown in Figures 11, 12 and 13.

The stripper comprises a base 32 within which a screw 33 is mounted, the screw being provided with right and left hand threads as shown in Figure 12 and being adapted to be rotated by means of the hand wheel 34. The screw engages the blocks 35, 36, which in turn are connected to the slides 37, 38. The slides at each side carry arms having hooks 39, 40, thereon which engage in the grooves 28, 29, heretofore referred to, whereas upper and lower plates 41, 42, engage in the horizontal notches 30, 31, shown in Figure 7. The pencil bodies are held in die members similar to those indicated in Figures 7 and 8 and a clamping force is applied to the dies by means of the pivoted arm 43 and the screw clamp 44. The lower surface 45 of the arm is slightly curved as shown in Figure 13 in order that the clamping force may be exerted on the center of the die. Thereafter, the hand wheel being rotated, the pins together with the head blocks are stripped, the plates 46 shown in Figure 7 remaining in position in abutting engagement with the ends of the pencil bodies; thus the possibility of breakage during the stripping operation is reduced.

After the pins are removed and the dies separated the pencil bodies are in their completed form there remaining substantially no fin of material if the measurement of the substance has been accurate. The bodies are highly polished, strong and rigid, and of great hardness. The subsequent operations on the pencil body, such as shaping the ends for the reception of tips, may be done by grinding.

As shown in Figure 7, we provide means for assuring the formation of a perfect molded material in another manner. It is always difficult to provide exactly the required amount of material even though the measurement by weight be very accurately carried out. For that reason we provide relief spaces consisting of grooves $22^a$ in the ends of the die and these are in communication with the mold space by a very thin space 22$^b$. This space is so narrow, being preferably about .002 of an inch, that the material can escape therethrough only in event of the most extreme pressure such as applied in the final step of the operation. At that time if the amount of material is too great to permit the die faces to meet, the excess material will be squeezed out through the spaces 22$^b$ and will form a fin which may easily be removed and which will not mar the appearance of the pencil because of the location; the ends of the molded blank are subsequently shaped to accommodate tips and this renders unimportant any roughness such as occasioned by a fin.

The heat requisite for the molding operations may be applied in different manners. We prefer, however, to employ electrical heating units, indicated at 47, in Figures 9 and 10. These will be provided with suitable electrical connections and operating switches but as they form no part of our invention they have not been illustrated.

In the drawings we have illustrated dies shaped to construct twelve pencil bodies simultaneously; the number is, of course, immaterial as the principle of operation is independent of the number formed at any time. The pressures applied in the two major operations are those found practical in the formation of twelve bodies at one time. Obviously many modifications may be made in the process and the apparatus and we do not wish to be limited except as indicated in the appended claims.

We claim:

1. The process of simultaneously forming a plurality of pencil bodies of fusible powdered phenolic condensation products which consists in placing in a mold a quantity of said powdered material sufficient to form a predetermined plurality of halves of pencil bodies, applying heat and pressure to partially fuse and solidify the material, the mold being shaped to provide a connecting fin between adjacent halves, then repeating the process to form a second series of halves, then assembling said series of halves in a mold and applying heat and pressure to fuse the assembled halves and to displace substantially all the material of the fins whereby the completed pencil bodies are substantially independent.

2. The process of forming hollow pencil bodies of fusible powdered material which consists in placing in a mold a quantity of material sufficient to form a half of a pencil body, applying heat and pressure to shape and partially solidify the material, then repeating the process to form a second half, then assembling said halves with a core projecting inwardly from an end thereof, then applying heat and pressure to complete solidification and unification of the halves, then withdrawing said core.

3. The method of forming pencil bodies, which consists in placing a quantity of powdered moldable substance in a mold, applying a relatively small amount of heat and pressure thereto to partially fuse said material and form a solid body in the shape of a portion of the completed pencil body, then combining a plurality of said portions in a second mold and applying sufficient heat and a greatly increased degree of pressure thereto in order to completely fuse said material.

4. The method of forming pencil bodies which consists in placing a quantity of a powdered fusible substance between a pair of suitable dies shaped to form a portion of the completed body, then applying a sufficient amount of heat and pressure to said dies to partially fuse said substance and render the resultant portion self-sustaining, then combining a plurality of so formed portions between a second pair of dies, and applying sufficient heat and an increased degree of pressure to said dies to complete the fusion of the material and form an integral body.

5. The method of forming pencil bodies, which consists in placing a quantity of powdered fusible substance sufficient to substantially exactly form a predetermined number of portions of a pencil body between a pair of dies, applying sufficient heat and pressure to said dies to partially fuse said material and to render the resultant product self-sustaining, the portions being connected by a web of material, then combining a plurality of said portions between a second pair of dies and supplying sufficient heat and increased pressure to complete the fusion of the material, join the portions into an integral body and displace substantially all the web of material which connected the portions in the product of the first step.

6. The method of forming pencil bodies which consists in placing a quantity of a powdered phenolic condensation product between a pair of suitable dies shaped to form a portion of the completed body, then applying a sufficient amount of heat and pressure to said dies to partially fuse said substance and render the resultant portion self-sustaining, then combining a plurality of so formed portions between a second pair of dies, and applying sufficient heat and increased pressure to said dies to complete the fusion of the material and form an integral body.

Signed at Chicago, Illinois, this 9th day of January, 1923.

MICHAEL M. KAUFMANN.
JOHN P. LYNN.
FRANK C. DELI.